Jan. 29, 1935.                F. JONES                1,989,366
                             FLOW METER
                          Filed Dec. 23, 1931

INVENTOR.
FRED. JONES.
BY G. F. McDougall
ATTORNEY.

Patented Jan. 29, 1935

1,989,366

UNITED STATES PATENT OFFICE 1,989,366

FLOW METER

Fred Jones, Portland, Oreg.

Application December 23, 1931, Serial No. 582,754

4 Claims. (Cl. 73—167)

My invention relates to appliances for the measuring of the flow of fluids.

The objects of my invention are to produce an instrument of the character described of great sensitiveness, wide range in capacity and particularly to overcome the difficulties now present in existing types of flow meters using Venturi tubes and orifices and such like measuring contrivances that offer serious impedance to the flow and which must be proportioned closely to the expected volume of flow in order to be reasonably accurate.

Another object of my invention is to produce an instrument of the character described wherein the frictional resistance offered by the instrument itself to the passage of the fluid being measured will be at a minimum.

A further object of my invention is to combine the accuracy of the types mentioned with the sensitiveness of a Pitot tube and without the disadvantages inherent in either type.

These and other objects of my invention in part mentioned and in part obvious in the subjoined description and claims constitute the purpose of my invention.

A drawing accompanies and forms a part of this specification and serves to illustrate an embodiment of my invention for the purpose of disclosing the principles thereof, but it must be remembered that this is only one form of the many forms that can be made to utilize the principles disclosed.

In the drawing,—

Fig. 4 is a section taken at the line 4—4 of Fig. 1;

Fig. 5 is a cross-section on the line 5—5 of Fig. 3; and

Fig. 6 is a cross-section on the line 6—6 of Fig. 2; the arrows in each case indicating the direction of sight.

A shell, 7, is provided with caps, 8 and 9, and an upstanding casing, A, is attached to the cap, 9, for the purpose hereinafter disclosed. An inlet, I, for the fluid to be measured is shown in the several views and an outlet, O, indicates the course of the fluid through the instrument. These two ducts will be exactly the same length and diameter. It will be noted that the cap, 8, and the cap, 9, extend for some distance over the shell, 7, which divides the interior of 8 and 9 in each case into two chambers, one of which is indicated by 7a and one by 7b; and there are also annular chambers, 8a and 9a. Foraminous screens, 10, are provided between the chambers 7a and 9a and 7b and 8a to prevent any foreign matter passing through the instrument to interfere with the mechanism thereof.

Figure 2:
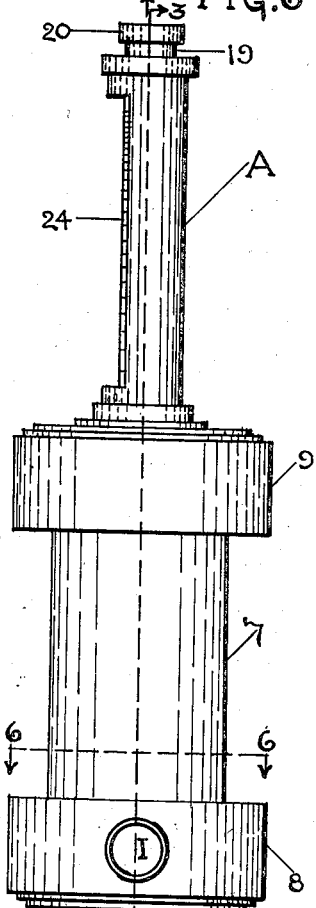
Fig. 2 is a view of the same structure illustrated in Fig. 1, viewed at a position at right angles thereto.

The casing, A, in the present instance is a tube having one side cut away as shown in Fig. 2 and it is provided with means such as the stuffing boxes, A', for holding the transparent tube, 25, and the scales as hereinafter described in detail.

Inside of the shell, 7, or it may be made integral therewith if desired, is found a filler, 11, and longitudinally of the center thereof on the axis of the instrument is found a passageway, 12, which is the inverted frustum of a right cone.

The filler, 11, or its equivalent, should be made of a material having a very low coefficient of expansion. For inert gases it can be made of neat Portland cement moulded over a polished mandrel; for some instruments it can be ground glass and for others of some of the steels having expansion coefficients approximating zero within ordinary temperature ranges.

Within the cap, 8, is found a spider, 13, adjustably mounted in all horizontal directions as shown in Fig. 5 by threaded portions on the ends of the spider and nuts, 14.

Figure 1:
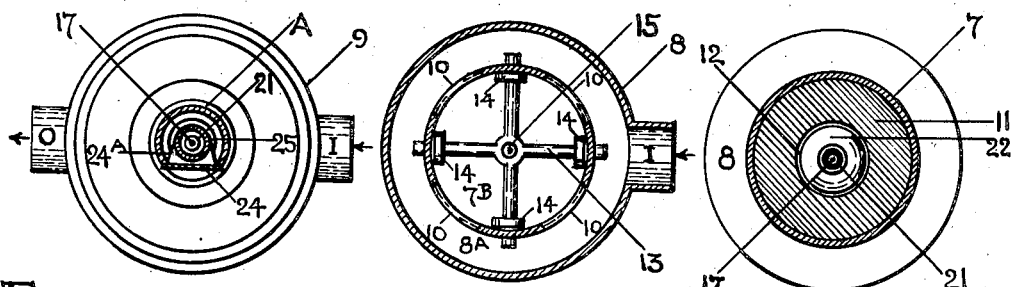
Fig. 1 is an elevation of the complete instrument in this particular embodiment.
Figure 1:
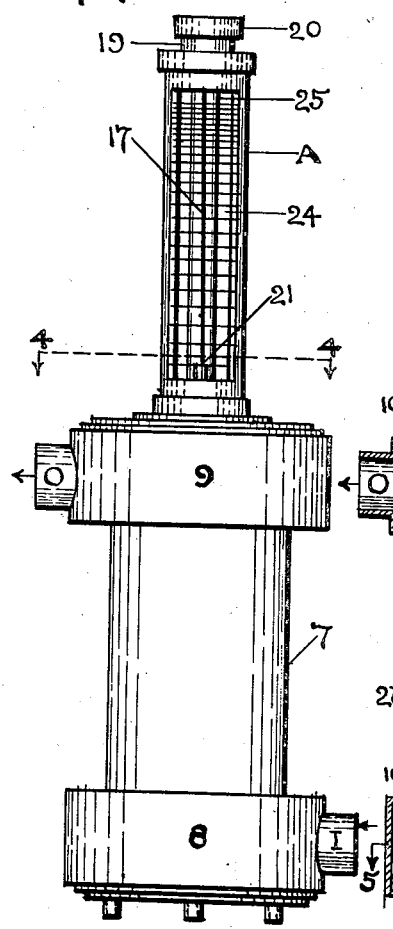
Figure 3:
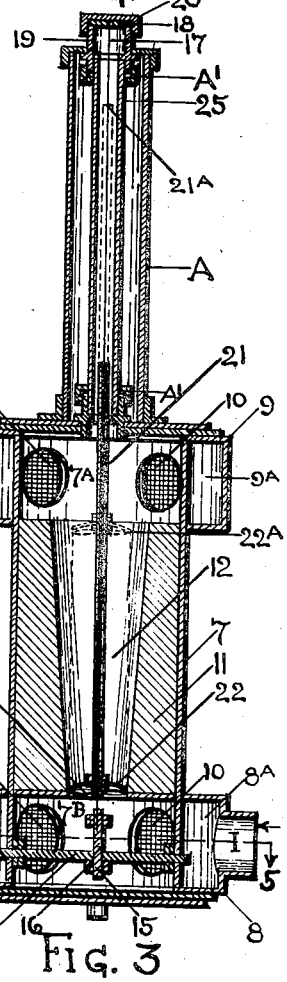
Fig. 3 is a longitudinal section of Fig. 2 on the line 3—3 of Fig. 2.

In the center of the spider, 13, is a tension staff, 15, provided with a nut, 16, which supports and stresses a wire, 17. The other end of the wire, 17, is supported by the element, 18, which is here shown as a disc supported on the structure, 19, and held fluid tight in place by the cap, 20. Mounted on the wire, 17, is the staff, 21, which has a central bore that loosely accommodates the wire, 17, and mounted upon the lower end of the staff, 21, is a disc, 22, which can well be made curved as shown in Fig. 3, and immediately below the disc, 22, and securely attached to the staff, 21, is a multi-bladed helical propeller, 23, the purpose of which is hereinafter explained. The upper end of the staff, 21, serves as a pointer to indicate the reading of the instrument on the scale, 24, which is on the outside of the transparent tube, 25. It will be noted that the scale, 24, is provided with a duplicate scale, 24a, which is folded around the opposite side of transparent tube, 25, with its indicia in registration with the indicia on the scale, 24; the scale 24 is a flat rigid transparency such as glass having the scale engraved thereon and the scale 24a is of transparent material such as celluloid and is folded around the transparent tube 25 and has both edges firmly attached to the scale 24 so that the two scales together are movable up and down on the transparent tube 25 and to be set in the original calibration of the instrument in a permanent relation to the tube.

The scale, 24a, is preferably made of celluloid or a similar opaque flexible material and is attached to scale 24 at its edges in any well known or preferred manner. Scale 24, except the graduations thereon, is transparent and may be made of glass or any suitable synthetic transparent material.

The purpose of the scale, 24a, is to prevent misreading of the instrument due to the eye of the observer being at an improper angle. When the eye of the observer is at the proper angle only one set of indicia will be seen and if at an improper angle a confusing blur of marks will indicate the necessity of adjusting the eye at the proper level to read the instrument.

The scale members are graduated in units of area of the annular space between the inner wall of the passageway 12 and the disc 22 which increases disproportionately to the length of the scale, as shown in the drawing.

The staff, 21, the disc, 22, and the helical propeller, 23, should be made of material having a specific gravity slightly in excess of the fluid to be measured.

The inlet, I, and the outlet, O, are the same size and it will be noted that all passages within the instrument with the exception about to be noted have a cross-sectional area considerably in excess of the area of the inlet or outlet. The exception to this is the lower end of the passage, 12, being the top of the frustum of the right cone when obstructed by the disc, 22. As shown in Fig. 3 the disc is shown in solid lines as at rest. It is shown in dotted lines at 22a at the position that it will occupy when the instrument is indicating a fluid flow to its maximum capacity. The staff, 21, is shown at 21a in dotted lines in the position that it will occupy when 22a serves to indicate the position of the disc, 22.

When fluid to be measured is admitted through the inlet, I, it passes through the instrument and out of the outlet, O, the disc, 22, will rise such a distance within the passageway, 12, that the area of the resulting annular clearance past the edge of the disc and between the disc and the walls of the passageway, 12, is proportional to the flow of the fluid; thus when the disc is in position as shown at 22 in Fig. 3, the passageway, 12, will be entirely obstructed and the top end of the staff, 21, will indicate zero on the scales, 24 and 24a. When it is at its maximum capacity it will indicate the amount of flow at the top of the scale whatever that may be. And at intermediate points the registration will correctly indicate the flow according to the scale previously computed. This scale is not a logarithmic scale nor is it a scale in arithmetical progression, but must be computed, which is a simple matter, for each cone. The arrangement of the chambers 8a and 7b, assures that no velocity of intake or efflux will affect measuring mechanism and the lower end of the frustro-conical measuring chamber is under the influence of pressure only, a part of this pressure will be transformed to velocity in passing from 7b to 7a where the velocity will practically disappear by being retransformed into pressure prior to going out through "O". The volume passing a given position of the disc 22 will therefore be the amount that will float the disc at that point. The weight of the disc being known, a constant is substituted for "p" in the fundamental equations for the flow of fluids (see Engineers' Handbook, first edition, Marks P 353–5) and the division lines on the scale should indicate the sum of uniform units of area of the annular space between the edge of the disc 22 and the walls of the frustro-conical measuring chamber 12, thus supplying the two unknowns of the equation.

By equipping my device with inlet and outlet of the same capacity I eliminate the variable due to expansion of the fluid passing through the instrument, pressures due to turbulence and other misleading variables.

Where it is desirable to mix commercial gas and air in the proportions of say 6:1 for furnace use the actual cubic feet of the air or gas is relatively unimportant, the gas being measured by a displacement meter and the air not requiring measurement at all except to get the correct proportion for efficient combustion. Therefore, I will place one instrument on the gas line and another on a source of air under the correct pressure and regulate flows until the air instrument shows a flow of six units to one on the gas instrument and the result is accomplished without any calculations required of the user, if the instruments have been properly constructed.

The longer the cone for a given diameter of base and top the coarser the graduations of the scale and the more accurate the reading. This will not affect the accuracy of the meter since the resistance offered by the disc, 22, and the superposed weight of the staff, 21, is a constant regardless of length of travel.

The purpose of the helical propeller, 23, is to impart a rotary motion to the disc, 22, and the staff, 21, and it has been found that this or an equivalent damping means must be used to prevent such a rapid movement of the indicating end of the staff, 21, due perhaps to pulsations of flow if any are present, that the reading of the scales would be uncertain.

It will now be seen that the instrument possesses the following characteristics; since the staff, 21, and the disc, 22, with the attached parts can be made so that their weight submerged in the fluid to be measured is comparatively insignificant, that little if any appreciable impedance is offered to the flow of the fluid; it is believed to be the only instrument known that will measure the flow first of exceedingly small quantities of a gas and at the same time correctly indicate the amount of the flow of very large quantities of the same gas and that will not offer an impedance approximately equal to the square of the volume of the gas as the consumption or use through the instrument proceeds from zero to maximum. There is in fact no increase in the resistance to the flow between minimum and maximum and what resistance there is, being a fixed quantity and known, can be taken care of in computing the scale and it will thus be seen that we have a flow meter that fully fulfills the objects enumerated in the preamble to this specification, great sensitiveness, high accuracy, simplicity and without intricate parts to detract from reliability.

Of the many uses to which this flow meter is adaptable, one may be cited as an outstanding example of its utility.

In aviation the proper consumption of fluid fuel of a motor is always definitely known when it is working at maximum efficiency. The operator or pilot, however, has no means of knowing whether the consumption of fuel with the motor in operation is greater or less than the desired amount. He must adjust the consumption purely by guess but with my new flow meter in the line between his fuel supply and his motor he has a visible index at all times, not only by which he may adjust his consumption but by which he is instantly apprised of any appreciable change therein.

It will be noted that the internal parts of my new flow meter such as the wire, the staff, propeller and the screens should be made of such material that they will not be affected by the fluid being measured should it have any effect normally to corrode materials either with or without the presence of atmospheric oxygen.

Many different constructions are possible in which the principles herein disclosed may be applied to the use described. I therefore do not wish to be restricted in the application of my new invention except by the terms of the following claims.

What I claim as new and desire to secure by Letters Patent, is—

1. In a flow meter, calibrated inlet and outlet means of equal capacity, a frustro-conical passageway between said inlet and outlet means, a disc movable in said conical passageway under the influence of moving fluid, a hollow staff attached to said disc, a tension wire through said staff, means for centering and supporting said tension wire and a scale member adapted to indicate rates of flow as indicated by a point on said staff.

2. A flow meter of the character described defined in part as a flow measuring chamber that is a frustum of a cone, a cupped disc supported movably along the axis of said measuring chamber and movable axially therein under the influence of flowing fluid, a hollow staff attached to said disc member, a tension wire adjustably supported axially of the frustro-conical measuring chamber, upon which the disc and staff are slidable, the wire passing through the hollow of the staff, and a propeller adapted to impart rotative motion to said disc under the influence of moving fluid whereby the axial movement of said disc is damped without interfering with its free movement.

3. In a flow meter of the character described, a body member provided with inlet and outlet means of the same capacity, a frustro-conical measuring chamber within said body member, velocity-pressure transformation chambers at both ends of said measuring chamber and communicating with said inlet and outlet means, respectively, a tension wire adjustably supported axially of the measuring chamber, a hollow staff upon said wire, a cupped disc mounted upon said staff perpendicular to the axis thereof, a damping means for said disc and means for visibly indicating the position of said disc with respect to the length of said measuring chamber.

4. In a flow meter for fluids, a body member for said meter enclosing a diffusion chamber at each end of said body, a frustro-conical flow measuring chamber positioned between the said diffusion chambers, a wire, adjustable means for supporting and carrying said wire axially of said measuring chamber, a hollow staff movable upon said wire, a disc mounted upon the said staff, means for damping said disc, a scale means for reading the position of said disc in units of area of the annular space between the disc and the wall of the measuring chamber, said scale points being indicated by the end of the hollow staff opposite that upon which the disc is mounted.

FRED JONES.